Dec. 25, 1951   C. R. MURPHY   2,579,847
PROCESS FOR THE PRODUCTION AND PURIFICATION
OF OXYGENATED HYDROCARBON COMPOUNDS
Filed Dec. 23, 1948
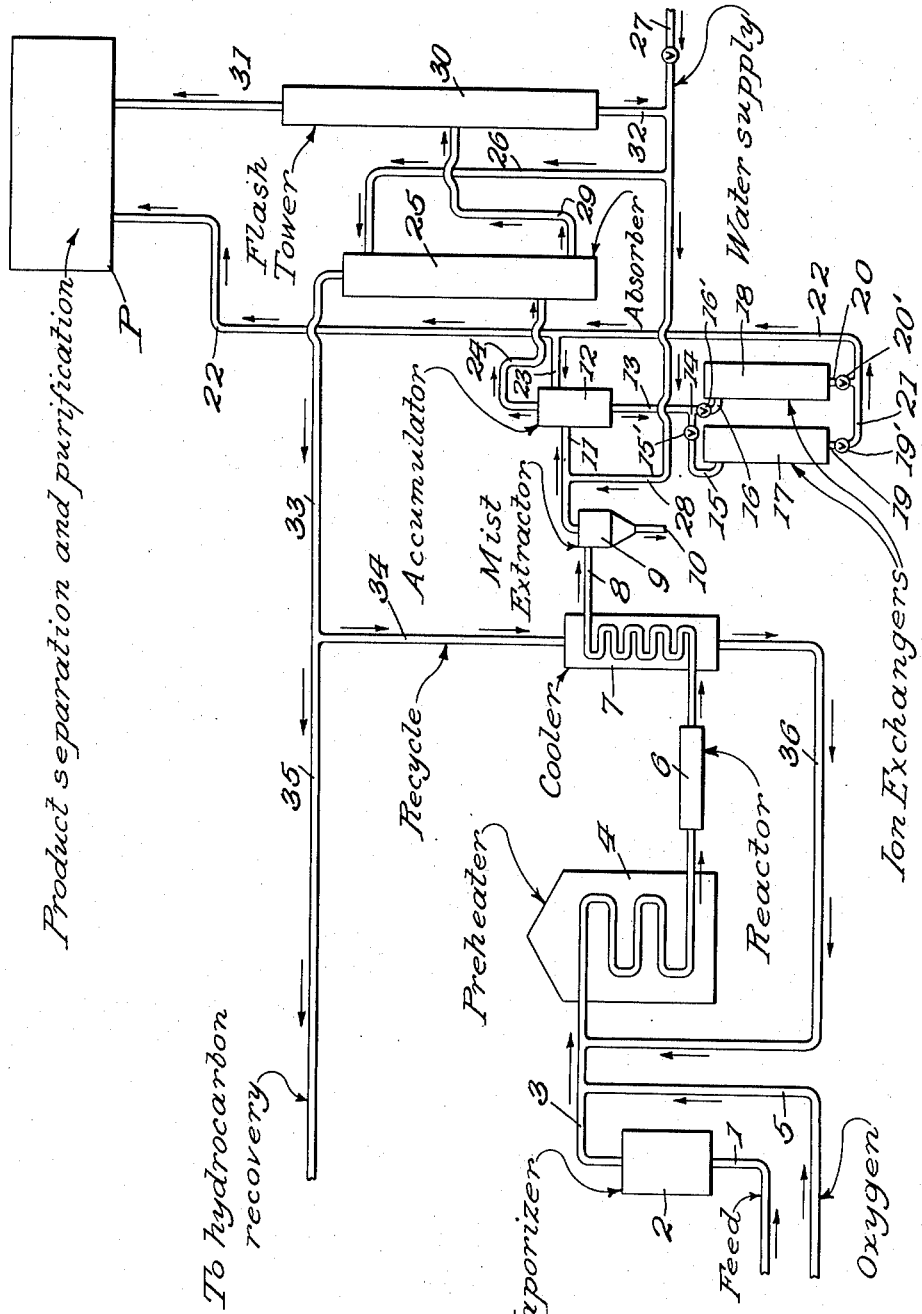
INVENTOR.
Clarence R. Murphy,
BY
Baldwin, Wight & Prevost,
attys.

Patented Dec. 25, 1951

2,579,847

UNITED STATES PATENT OFFICE 2,579,847

PROCESS FOR THE PRODUCTION AND PURIFICATION OF OXYGENATED HYDROCARBON COMPOUNDS

Clarence R. Murphy, Tulsa, Okla., assignor to Warren Petroleum Corporation, Tulsa, Okla.

Application December 23, 1948, Serial No. 67,002

9 Claims. (Cl. 260—451)

This invention consists in new and useful improvements in a process for the production and purification of oxygenated hydrocarbon compounds and represents a refinement of the process covered by my copending application Serial No. 789,699, filed December 4, 1947. It should be noted however, that the novel purification features of the present invention may advantageously be employed in connection with other processes for the production of oxygenated hydrocarbon products, although primarily designed for use in connection with a process such as described in my said copending application. In other words, my improved method is adaptable to high pressure and high temperature oxidation processes such as those operating under temperatures of from 500° F. to 1000° F. and pressures up to 1000 lbs., and using various hydrocarbons and oxygen containing gases in the charging mixture.

The principal object of the present invention is to provide a method of removing high boiling color bodies and acids from the products obtained in a process involving the partial oxidation of hydrocarbons, as an integral part of the process. In the vapor phase oxidation of hydrocarbons, using oxygen, air, or other oxygen-containing gases as the oxidizing medium, products of a very heterogeneous nature are usually obtained. For example, in the non-catalytic controlled partial oxidation of propane under conditions favoring aldehyde and alcohol production, appreciable quantities of organic acids, glycols, resins, and other high boiling color bodies are formed. Attempts to recover aldehydes and alcohols from this mixture by distillation, result in an appreciable loss of both aldehydes and alcohols. The aldehydes, for example, formaldehyde, are very valuable and it has been found that this chemical is difficult to purify in the presence of glycols, resins and other high boiling color bodies. Furthermore, the resins formed are reddish brown, amorphous, viscous materials that solidify on cooling and tend to complicate the process by adhering to the walls of the apparatus, eventually plugging the system and thereby causing costly plant shut downs.

While the process described in my said copending application is highly successful as an oxidation process and minimizes the formation of undesirable acids with materially increased yields of desirable oxygenated compounds, I have found that if even these small amounts of acids present in the product, are removed from the systm substantially as soon as they are formed, I obtain a marked improvement in the yields of aldehydes and alcohols in the final product of the process. In other words, this feature of my present process may be considered a preventative measure in removing the acids as they are formed and before they become harmful, as distinguished from processes heretofore known which in effect, required curative measures to remove the acids from the product after leaving the system, and after said acids have effected their harmful influence on the products.

It is recognized by those skilled in the art that only a small amount of acid need be present in a mixture containing aldehydes and alcohols, to catalyze the reaction between them and produce acetals, such as:

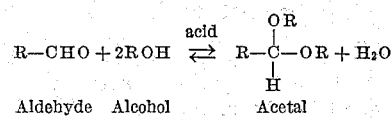

Aldehyde  Alcohol  Acetal

Also, acids and alcohols when present together in a solution will unite with each other to produce esters, such as:

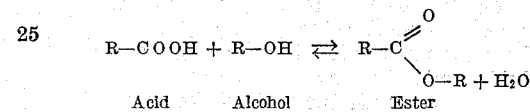

Acid  Alcohol  Ester

When normally gaseous hydrocarbons are reacted with commercial oxygen by a controlled partial oxidation process, an oxygenated product is obtained that contains aldehydes, alcohols, acids, acetals and esters. The acetals and esters, which are of little value, are not actually formed in the oxidation process itself but result from side reactions between aldhydes and alcohols which are catalyzed by the acids, and by alcohols uniting with acid. It is therefore an object of this invention to completely separate the acids immediately as they are formed, from the alcohols and aldehydes which are produced by partial oxidation of hydrocarbon, in order to prevent further reaction between them with the resultant formation of undesirable acetals and esters, and to continuously maintain the acid concentration in the oxygenated product below approximately .02%.

A further object of my invention is to eliminate the necessity for the use of expensive, highly corrosive resistant materials in the construction of a plant to process the product obtained by the partial oxidation of hydrocarbons, by removing the acids from the system at a point in the process before they become harmful.

In carrying out my invention, I have found that the removal of acids may be conducted in either one or both of two steps. The first or preliminary acid removal step preferably consists in the physical separation and removal of the high boiling color bodies and the major portion of the acids, practically as soon as the reaction mixture leaves the reaction zone, by means of a mist extractor or cyclone separator of conventional form. The second or final acid removal step preferably consists in chemically removing the remaining acids from the mixed non-volatile oxygenated products after the latter have been separated from the volatile products of the reaction, but before the oxygenated products leave the system for final separation and purification.

In the preferred form of this final acid removal step, I percolate the mixed non-volatile oxygenated products through a suitable ion exchange medium which is usually a high molecular weight resin or solid material of the aromatic amine type, specially designed to unite with acids. The ion exchange medium adsorbs the acids present and the resultant oxygenated products leave the system for final separation and purification, in a substantially acid free state.

Broadly, the principle of ion exchange has been known for many years and used industrially in the softening of water. In more recent years, various types of organic materials, possessing ion exchange properties have been developed. The advent of organic cation exchangers made possible the exchange of hydrogen ions and led to the development of acid adsorbent resins whereby complete deionization of solutions became a practical reality and opened the door to a whole new field for the application of the ion exchange principle.

Briefly, ion exchange may be defined as the reversible interchange of ions between a liquid and a solid involving no appreciable change in the structure of the solid. There are two types of ion exchange, (1) cation exchange, where the positive ions in solution are exchanged for the positive ions of an insoluble matrix, and (2) anion exchange in which the negative ions in solution exchange with the negative ions of an insoluble solid or where acids in solution are adsorbed in an insoluble form on the solid. Reversibility of this reaction makes it possible to restore the original ions of the exchange material after its activity has been exhausted. The regenerability permits the exchange material to be used and reused through innumerable cycles.

The principle of anion exchange used in this invention is not fully understood, but it appears to take place as an addition reaction in which the whole acid molecule is adsorbed. Acids may thus be removed from solution:

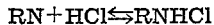

where RN is the anion exchange resin. The anion exchanger may be regenerated with an alkali such as soda ash, caustic soda, or ammonia.

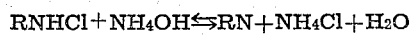

The use of ion exchange methods for separating acids from aldehydes, is practiced industrially for the removal of small amounts of acids from commerical formaldehyde solutions, but so far as I know, such methods have never been employed as an intermediate step in a process for the manufacture and purification of oxygenated hydrocarbon compounds, nor for a purpose similar to that contemplated in the present invention.

A still further object of my invention is to establish and maintain the aldehyde concentration in the mixture of oxidation products accumulated anterior to the ion exchange step, sufficiently high to facilitate the subsequent purification thereof. This, I accomplish by continuously returning to the accumulator zone a portion of the stream of acid-free products leaving the ion exchange zone for final separation and purification.

With the above and other objects in view which will appear as the description proceeds, my invention consists in the novel features herein set forth, illustrated diagrammatically in the accompanying drawing, and more particularly pointed out in the appended claims.

The drawing diagrammatically represents one form of apparatus which may be employed for carrying out my improved process. However, it will be understood that other apparatus may be employed if desired.

Referring to the drawing, I represents a line for feeding the desired hydrocarbon charge to a vaporizer 2 which is connected by line 3 to the coil of a suitable preheating furnace 4. A line 5 leading from a source of oxygen-containing gas, which may be in the form of pure oxygen or air, is connected to line 3 at a mixing point anterior to the preheater 4.

The coil of the preheater 4 is connected to the inlet end of a reactor 6, the discharge end of which leads to the coil of a cooler, preferably in the form of a conventional heat exchanger 7, said coil discharging through line 8 into a mist extractor 9, which may be of any conventional form, such as a cyclone separator. The inlet pipe 8 preferably enters the cyclone separator tangentially to its periphery and the bottom walls of the separator converge and terminate in communication with an acid outlet pipe 10.

The top of the mist extractor 9 is connected by line 11 to an accumulator 12 where the products from the mist extractor 9 are accumulated and separated into volatile and non-volatile components. From the bottom of the accumulator 12, a line 13, having a T-coupling 14, is connected by branch lines 15 and 16 to a pair of ion exchangers 17 and 18 arranged in parallel. Suitable valves 15' and 16' are arranged in lines 15 and 16 respectively, for directing the material under treatment to a selected ion exchanger. Discharge lines 19 and 20 provided with valves 19' and 20', are respectively connected into the bottoms of the ion exchangers 17 and 18 and lead to a manifold 21 which is connected into a discharge conduit 22 leading to a product separation and purification apparatus illustrated diagrammatically at P. A branch line 23 connects product discharge line 22 back into the upper portion of the accumulator 12 for recirculating a portion of the product from the ion exchanger, as will later appear.

The top of the accumulator 12 is connected by line 24 to the lower portion of an absorber 25, the upper end of which is connected by line 26 with a water supply line 27, leading from a suitable source of water (not shown). The water supply line 27 is extended as at 28, to communicate wtih line 11 leading from the mist extractor 9 to the accumulator 12. The lower end of the absorber 25 is connected by line 29 to a flash tower 30, from the upper end of which a line 31 leads to the product separation and purification apparatus P. The bottom of the flash tower 30 is provided with a water return line 32 which is connected back into line 27, whereby the water from flash tower 30 may be recirculated either through line 26 or line 28 or both, as will hereinafter appear.

The upper end of the absorber 25 is provided with a residue gas line 33, having two branch connections 34 and 35. The line 34 is connected into the top of the heat exchanger 7, the lower end of which discharges into recycle line 36 which leads back to the feed mixing line 3 anterior to the preheater 4. The other branch 35 of line 33 leads to a suitable hydrocarbon recovery apparatus (not shown), which may be in the form described in my copending application above mentioned.

In the operation of my process, a suitable fluid hydrocarbon feed such for example as propane or butane, is introduced through line 1 into vaporizer 2 from which the hydrocarbon vapors are conducted into the preheating furnace 4 through the mixture charging line 3. Oxygen, air, or any suitable oxygen-containing gas is introduced into line 3 through feed line 5 and is mixed with the hydrocarbon vapors entering the preheating furnace 4. The preheated mixture is then conducted to the inlet end of a suitable reactor 6 where additional heat is generated, due to the exothermic nature of the reaction, the rate of flow of the mixture through the reactor being preferably so regulated that all of the free oxygen is consumed by the time the mixture reaches the discharge end of the reactor 6. At this point the reaction gases are usually at a temperature in the neighborhood of 750° F. to 800° F. and preferably at a pressure of approximately 90 lbs. gauge. These gases are now passed into the coil of the heat exchanger 7 where the temperature is lowered to below the dew point of the products to be separated, which is approximately 165° F. to 175° F. The cooling is effected by the return of the recycle stock through lines 33 and 34 to the upper end of the heat exchanger 7, said recycle being conducted from the heat exchanger back to the mixing line 3 through line 36.

The cooled mixture is then passed into the mist extractor or trap 9 where the condensed acids, resins, and other high boiling reaction products are separated by centrifugal action, and withdrawn through line 10 in the bottom of the separator 9. These separated products, in the liquid form include the color bodies and the major portion of the acids formed during the reaction and may be conducted by line 10 to a suitable purification unit, not shown, for refining the acids and glycols.

The gases leaving the top of the mist extractor 9 through line 11, are then mixed with sufficient water, supplied by pipes 27, 28, to permit the efficient separation of the non-volatile oxygenated products in the accumulator 12.

Here, the volatile chemicals and other materials in vapor form, flash away from the non-volatile oxygenated compounds and are conducted through line 24 to the lower portion of absorber 25. The aqueous oxygenated product separated in the accumulator 12, containing the acids which were not removed by the mist extractor 9, along with some aldehydes and alcohols, is continuously conducted through line 13 to one of the ion exchangers 17 or 18. As before stated, these ion exchangers are arranged in parallel and by proper manipulation of the valves 15' and 16' and 19', 20', either one of the ion exchangers may be employed and the other cut out of the system.

These ion exchangers are packed with an ion exchange medium, preferably a high molecular weight resin of the aromatic amine type, such for example, as one of the resins known as "amberlite" or "ionac." The aqueous acid solution from line 13 percolates through the ion exchange resin in the selected ion exchanger 17 or 18, and any acid present in the solution is adsorbed by the resin and thus removed from the oxygenated product. A portion of the acid-free product is then conducted by line 22 to a suitable plant for product separation and purification, designated generally by the letter P. In order to establish and maintain the aldehyde concentration in the accumulator 12, sufficiently high to facilitate subsequent purification of the product, I continuously return a large portion of this acid-free material from the discharge line 22, to the upper portion of the acumulator 12, through line 23, where it mixes with the reaction product and acts to separate more non-volatile oxygenated product from the volatile product. In other words, the non-volatile material from the accumulator 12 is continuously percolated through the ion exchange resin and a portion of the acid-free product from the ion exchanger is continuously recycled to the accumulator, while another portion of the acid-free material is conducted to the separation and purification plant From time to time the ion exchangers are reversed and the ion exchange medium in the spent unit is regenerated with an alkali such as soda ash, caustic soda or ammonia, for reuse.

As before stated, the volatile oxygenated products from the upper portion of the accumulator 12 are conducted to the absorber 25. In this absorber, water at normal temperature enters the top of the tower through line 26 and flows countercurrently to the incoming volatile gases from the accumulator 12, absorbing the oxygenated chemicals from the unreacted hydrocarbon gases. This water and the absorbed chemicals are carried to the flash tower 30 through line 29, for flashing the chemicals away from the water, said chemicals being discharged through line 31 at the top of the flash tower and conducted to the separation and purification plant P. The water from which the chemicals have been flashed is recirculated through lines 32, 27 and 28 for further use in connection with the mixture entering the accumulator 12 and the absorber 25.

From the absorber 25, the residue gases including recycle stock and vent gases, are withdrawn through line 33. The recycled material is conducted through line 34, heat exchanger 7 and line 36 back to the mixture charging line 3, while the remaining gases are conducted through line 35 to a suitable hydrocarbon recovery plant.

As before stated, the acid removal steps, although preferably used jointly, may be employed individually in carrying out my invention. While the drawing does not illustrate a means for bypassing one or the other of these units, it will be obvious that any suitable valve arrangement may be employed for this purpose. In any event, to illustrate the effectiveness of the respective acid removal steps, the following specific examples are given showing the results of the individual acid removal methods.

In one test run, commercial propane at the rate of 15 scfm. and commercial oxygen at the rate of .45 scfm., were reacted in the above described apparatus but without either the mist extractor 9 or the ion exchangers 17, 18. This operation was conducted at 700° F. in the reactor with 90 lbs. gauge pressure and produced in the non-volatile portion of the oxygenated chemicals withdrawn from the accumulator 12, an aqueous reddish brown, opaque solution containing 10.0% formaldehyde and 0.6% acids. In this run the formaldehyde to acid ratio was 16.6 to 1.

In the same apparatus, this time placing the trap or mist extractor 9 in operation, to separate the acids, glycols, resins, and other high boiling color bodies from the oxygenated product, another quantity of propane at the rate of 15 scfm. and commercial oxygen at a rate of .45 scfm. were reacted under the same conditions as the previous run. In this case it was found that the non-volatile portion of the oxygenated product withdrawn from the accumulator 12 was an aqueous, pale, straw colored, transparent solution containing 10.2% formaldehyde and .22% acids, giving a formaldehyde-acid ratio of 50 to 1. The portion of the reaction product which was collected in the trap 9 and withdrawn through line 10 was a very dark brown, viscous, resinous material, containing 6.4% acid.

A comparison of the results from the above two identical partial oxidation runs, one without using the mist extractor 9 and the other using the mist extractor is as follows:

|  | Non-volatile portion of oxidation product | | |
|---|---|---|---|
|  | Per Cent $CH_2O$ | Per Cent acid | $CH_2O$/acid ratio |
| Run No. 1 (without mist extractor) | 10.0 | .60 | 16.6/1 |
| Run No. 2 (with mist extractor) | 10.2 | .22 | 50/1 |

This data indicates that 63.4% of the acid produced as a product of the partial oxidation of propane herein illustrated, is removed by the trap or mist extractor along with practically all of the resins and other color bodies and high boilers.

The results indicated above were even more pronounced when air was used as the oxygen supplying gas and other inert materials were allowed to remain in the system during the oxidation reaction.

Now, to illustrate the effectiveness of the ion exchange step as an integral part of an oxidation process, the following test runs were conducted:

3.3 lbs. of commercial propane were reacted with oxygen at a uniform rate in the above described apparatus, but without the mist extractor 9 or the ion exchangers 17, 18 in operation. The test was conducted at 700° F. and 90 lbs. pressure to produce a product from which 6.25 lbs. of oxygenated chemicals, including aldehydes, alcohols, acetals, esters and acids were isolated. Of this amount only 4.66 lbs. of pure aldehydes and alcohols could be economically recovered.

In another run, using the same apparatus, but with the ion exchanger in operation to completely remove any acid from the reaction product, as quickly as it was produced, another 3.3 lbs. of commercial propane was reacted with a similar quantity of oxygen at the same rate, temperature, and pressure as in the preceding run. This produced 6.22 lbs. of oxygenated acid-free chemicals, from which 6.0 lbs. of the desirable aldehydes and alcohols were separated and recovered in the pure state. It is obvious from this example that approximately 29% more valuable aldehydes and alcohols may be recovered from the oxygenated product by completely and continuously separating the acids as they are formed, in order to prevent the deleterious side reactions which produce the undesirable acetals and esters.

It will be clear from the above examples, that if the two acid removal steps are used jointly in the oxidation process, even more effective results may be obtained. The mist extractor is essentially a preliminary step for removing the major portion of the acids along with the high boiling color bodies so as to avoid overtaxing the ion exchange medium, which removes the remaining acids going over from the top of the mist extractor 9 to the accumulator 12. The results of the test run using the ion exchanger are set out in terms of quantities rather than ratios, as such results show complete removal of acid.

From the explanation of the theory in the early part of this specification and the above description of the test runs, it will be apparent that by continuously separating the acids from the oxygenated product, and maintaining their concentration therein below approximately .02%, I have developed a decided improvement in a method for separating and purifying hydrocarbon oxidation products. The advantages of my improved method may be briefly summarized as follows:

1. Increase yields of desirable aldehydes and alcohols by elimination of deleterious side-reactions.

2. Simplify the purification of the crude oxygenated chemicals by eliminating the acids, resins and other color bodies and high boiling materials, such as glycols from the oxygenated product.

3. Eliminate plugging of the heat exchangers, coolers, et cetera, by the resins, and thereby prevent costly plant shut-downs.

4. Simplify the purification of the acids and glycols produced in the reaction by separating and concentrating them in the trap or mist extractor.

5. Reduce corrosion in the system, and thus eliminate the necessity of using expensive highly corrosive resistant materials of contruction for a plant to purify the oxygenated product from a controlled partial oxidation of hydrocarbon process.

From the foregoing, it is believed that my invention may be readily understood by those skilled in the art without further description, it being borne in mind that numerous changes may be made in the details disclosed, without departing from the spirit of the invention, as set out in the appended claims.

I claim:

1. In a process for the production of acid-free, oxygenated hydrocarbon compounds by the partial oxidation of hydrocarbons to produce gaseous reaction products, the steps of separating the high boiling constituents of the reaction mixture, including color bodies and the major portion of acids formed in the reaction, by cooling the gaseous reaction product to a temperature below the dew point of the acids and color bodies, separating condensed acids and color bodies, and conducting the low boiling constituents to an accumulating zone where separation of the non-volatile oxygenated compounds from the volatile portion of the mixture takes place.

2. The method of preventing the formation of acetals and esters by the catalytic effect of acids produced in a reaction process for the manufacture of oxygenated hydrocarbon compounds by the partial oxidation of hydrocarbons to produce gaseous reaction products, which comprises removing the acids from the system substantially as they are formed in the reaction and before the withdrawal of the oxygenated compounds by cooling the gaseous reaction product by heat exchange with recycle stock, to a temperature below the dew point of the acids and color bodies to form a condensate containing condensed acids, and color bodies, physically separating condensate containing acids and color bodies.

3. In a process for the oxidation of normally gaseous hydrocarbons to produce oxygenated hydrocarbon compounds by the partial oxidation of hydrocarbons to produce gaseous reaction products, the method of inhibiting the formation of acetals and esters in the reaction product, comprising subjecting the products from the reaction zone to cooling to form a condensate containing acids and color bodies, and subjecting the reaction resulting cooled mixture to centrifugal action to remove the high boiling constituents thereof, including a major portion of the acids and color bodies formed in the reaction, separating from the remaining mixture, the volatile products of the reaction, and subjecting the non-volatile products of said mixture to the action of an anion exchange medium to remove the remaining acids, prior to withdrawal of the product from the system.

4. In a process for the oxidation of normally gaseous hydrocarbons to produce oxygenated hydrocarbon compounds by the partial oxidation of hydrocarbons to produce gaseous reaction products, the step of inhibiting the formation of acetals and esters in the reaction product by removing the acid from the reaction mixture as rapidly as it is formed and prior to the withdrawal of the product from the system by cooling the gaseous reaction product by heat exchange with recycle stock, to a temperature below the dew point of the acids and color bodies to form a condensate containing condensed acids, and color bodies, physically separating condensate containing acids and color bodies.

5. In a process for the oxidation of normally gaseous hydrocarbons to produce oxygenated hydrocarbon compounds by the partial oxidation of hydrocarbons to produce gaseous reaction products, the step of inhibiting the formation of acetals and esters in the reaction product by continuously removing the acid from the reaction mixture as rapidly as it is formed and prior to the withdrawal of the product from the system by cooling the gaseous reaction product by heat exchange with recycle stock, to a temperature below the dew point of the acids and color bodies to form a condensate containing condensed acids, and color bodies, physically separating condensate containing acids and color bodies.

6. In a process for the oxidation of normally gaseous hydrocarbons to produce oxygenated hydrocarbon compounds by the partial oxidation of hydrocarbons to produce gaseous reaction products, the method of inhibiting the formation of acetals and esters in the reaction product, comprising subjecting the products from the reaction zone to cooling to form a condensate containing acids and color bodies, and subjecting the resulting cooled mixture from the reaction zone to centrifugal action to remove the high boiling constituents thereof including acids and color bodies formed in the reaction, prior to the withdrawal of the product from the system.

7. In a process for the oxidation of normally gaseous hydrocarbons to produce oxygenated hydrocarbon compounds by the partial oxidation of hydrocarbons to produce gaseous reaction products, the method of inhibiting the formation of acetals and esters in the reaction product, comprising cooling the reaction product to condense non-volatile products, physically separating the non-volatile products, and subjecting the non-volatile products of the mixture from the reaction zone to the action of an anion exchange medium to remove the acids therein, prior to withdrawal of the product from the system.

8. In a process for the oxidation of normally gaseous hydrocarbons to produce oxygenated hydrocarbon compounds by the partial oxidation of hydrocarbons to produce gaseous reaction products, the method of inhibiting the formation of acetals and esters in the reaction product, comprising partially cooling the mixture from the reaction zone to a temperature below the dew point of acids and color bodies therein to condense color bodies and acids, and subjecting said mixture to centrifugal action to remove the high boiling constituents thereof including acids, glycols, color bodies and other high boiling constituents, prior to withdrawal of the product from the system.

9. In a process for the partial oxidation of hydrocarbons to produce acid-free oxygenated organic products, wherein gaseous reaction products are obtained, the steps of cooling the reaction gases to a temperature below the dew point of the acids and color bodies in the reaction gases, separating the liquid constituents which contain the color bodies and a major portion of the acids by centrifuging, and withdrawing them from the system, further cooling the remaining gaseous product to just below the dew point of the water contained therein, treating the liquid portion by anion exchange for final removal of any acids and color bodies therein, and recovering a substantially acid-free mixture of oxygenated compounds therefrom.

CLARENCE R. MURPHY.

REFERENCES CITED

The following references are of record in the file of this patent:

UNITED STATES PATENTS

| Number | Name | Date |
|---|---|---|
| 2,341,907 | Cheetham et al. | Feb. 15, 1944 |
| 2,369,710 | Bludworth | Feb. 20, 1945 |
| 2,497,973 | Bludworth et al. | Feb. 21, 1950 |

OTHER REFERENCES

Meyers et al.: Ind. Eng. Chem., vol. 33, No. 6, pages 697–706.